No. 799,857. PATENTED SEPT. 19, 1905.
C. F. LOFTUS.
LOCKING DEVICE FOR VEHICLE AND OTHER WHEELS.
APPLICATION FILED MAY 14, 1904.
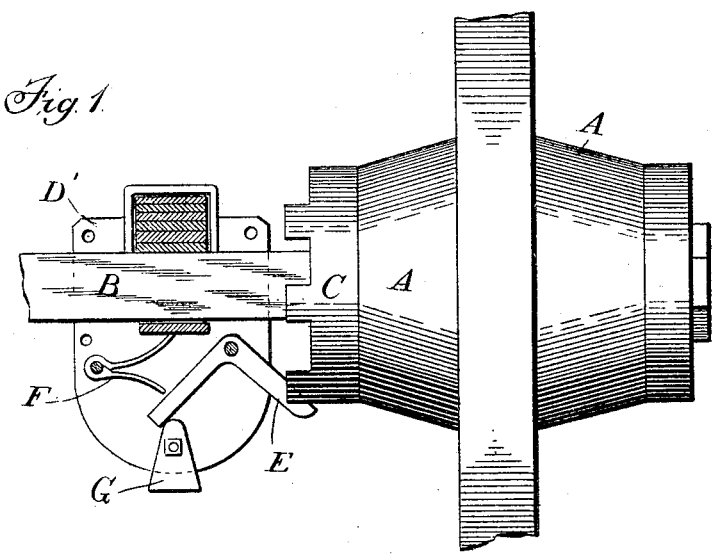
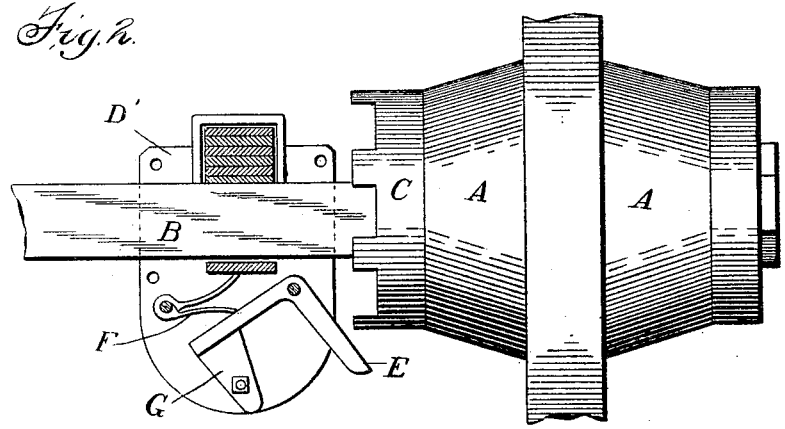
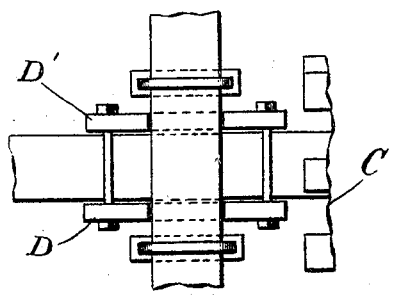

UNITED STATES PATENT OFFICE.

CHARLES FREDERICK LOFTUS, OF SOUTH BRISBANE, QUEENSLAND, AUSTRALIA, ASSIGNOR TO THOMAS LOFTUS, OF SOUTH BRISBANE, QUEENSLAND, AUSTRALIA.

LOCKING DEVICE FOR VEHICLE AND OTHER WHEELS.

No. 799,857.     Specification of Letters Patent.     Patented Sept. 19, 1905.

Application filed May 14, 1904. Serial No. 207,959.

*To all whom it may concern:*

Be it known that I, CHARLES FREDERICK LOFTUS, a subject of the King of Great Britain and Ireland, and a resident of John street, Kangaroo Point, South Brisbane, in the State of Queensland, Commonwealth of Australia, have invented a certain new and useful Locking Device for Vehicle and other Wheels, of which the following is a specification.

This invention relates to means for locking all classes of wheels, but particularly the wheels of road-vehicles, and has for its object the production of a simple device which may be readily attached to existing vehicles and which is very simple in its operation.

In carrying out this invention I attach a notched band on or slot the hub of the wheel, and on the axle I fit a clutch-gear consisting, preferably, of a bell-crank or lever suitably pivoted so as to engage (when desired) with the before-mentioned notches or slots and operated by a handle in convenient reach of the driver or other occupant of the vehicle.

The wheel-lock may be applied to the rim of the wheel; but I prefer to place it as already mentioned.

The details of the invention may be varied in several respects.

Referring to the drawings which form a part of this specification, Figure 1 is an elevation with one plate removed, showing the wheel locked. Fig. 2 is an elevation with one plate removed, showing the device out of action and the wheel free. Fig. 3 is a plan view showing plates bolted to axle.

A is the hub of the wheel; B, axle of vehicle; C, a notched band shrunk onto the hub.

Onto the axle are bolted two plates D and D'. Pivoted to one of the bolts is a bell-crank or double-armed pawl E. F is a spring pivoted to a spindle, which may be riveted or otherwise secured to the plates. This spring throws one end of the pawl into engagement with the notches on band C.

G is a tripper with square hole at heel for receiving a square spindle, the ends of which are rounded for pivoting into round holes in the plates, and one end of the spindle protrudes beyond the face of the plate, acting as a handle for operating the tripper and which may be by a connecting-lever carried up the side of the vehicle within reach of the driver, or the end may be squared off for receiving a key-lever. The locking end of the tripper is enlarged and has its edge straight, so that where said edge engages the lever it holds the said lever positively in its release from the notches of the hub. When the tripper is turned in the direction as shown in Fig. 2, it releases the pawl from the notched band C, and when turned in the opposite direction one arm of the pawl is thrust out and engages with a notch on band C on the revolving of the hub, thus securely locking the wheel.

The locking device is shown as applied to a spring-cart and fixed below the spring. As the springs and coupling form no part of this invention, reference to same is unnecessary. When used for light vehicles, it can be placed on the axle between the spring and the hub and may be so placed that the pawl works on a horizontal plane to the axle.

Having now described my invention, what I claim as new, and desire to secure by Letters Patent, is—

In combination with a vehicle-axle, a hub thereon, having recesses, a pivoted lever carried by the axle adapted to engage the recesses of the hub, a rotary eccentric trip for the lever adapted to release said lever from the notches, the contacting end of the trip being enlarged to positively hold the lever in its release and a locking-spring bearing against the lever.

In witness whereof I have hereunto set my hand in presence of two witnesses.

CHARLES FREDERICK LOFTUS.

Witnesses:
E. GARLAND ABELL,
M. E. N. ABELL.